(12) United States Patent
Frankel et al.

(10) Patent No.: US 9,578,397 B2
(45) Date of Patent: Feb. 21, 2017

(54) MEDIA FILE FORMAT, SYSTEM, AND METHOD

(75) Inventors: Justin Charles Frankel, San Francisco, CA (US); Thomas Pepper, Boulder Creek, CA (US)

(73) Assignee: AOL Inc., Dulles, VA (US)

( * ) Notice: Subject to any disclaimer, the term of this patent is extended or adjusted under 35 U.S.C. 154(b) by 731 days.

(21) Appl. No.: 13/489,273

(22) Filed: Jun. 5, 2012

(65) Prior Publication Data
US 2012/0311418 A1 Dec. 6, 2012

Related U.S. Application Data

(63) Continuation of application No. 10/740,839, filed on Dec. 22, 2003, now Pat. No. 8,230,094.

(60) Provisional application No. 60/466,046, filed on Apr. 29, 2003.

(51) Int. Cl.
*G06F 15/16* (2006.01)
*H04N 21/8547* (2011.01)
*H04L 29/06* (2006.01)

(52) U.S. Cl.
CPC ........ *H04N 21/8547* (2013.01); *H04L 65/604* (2013.01)

(58) Field of Classification Search
CPC .............................. H04L 65/60; H04L 65/604
USPC ......................................................... 709/219
See application file for complete search history.

(56) References Cited

U.S. PATENT DOCUMENTS

| | | | |
|---|---|---|---|
| 5,627,863 A * | 5/1997 | Aslanis | H04L 27/2665 370/509 |
| 5,929,921 A | 7/1999 | Taniguchi et al. | |
| 6,041,345 A | 3/2000 | Levi et al. | |
| 6,442,517 B1 | 8/2002 | Miller et al. | |
| 6,785,688 B2 | 8/2004 | Abajian et al. | |
| 7,096,416 B1 * | 8/2006 | Smith et al. | 715/203 |
| 7,139,808 B2 | 11/2006 | Anderson et al. | |
| 7,188,186 B1 | 3/2007 | Meyer et al. | |
| 7,301,944 B1 * | 11/2007 | Redmond | 370/390 |
| 7,395,355 B2 | 7/2008 | Afergan et al. | |
| 2002/0015092 A1 | 2/2002 | Feder et al. | |
| 2002/0059363 A1 | 5/2002 | Katz et al. | |
| 2002/0062313 A1 | 5/2002 | Lee et al. | |
| 2002/0085715 A1 | 7/2002 | Ripley | |
| 2003/0061369 A1 | 3/2003 | Aksu et al. | |
| 2003/0187811 A1 * | 10/2003 | Chang et al. | 707/1 |
| 2003/0222994 A1 | 12/2003 | Dawson | |

(Continued)

*Primary Examiner* — Jason Recek
(74) *Attorney, Agent, or Firm* — Finnegan, Henderson, Farabow, Garrett & Dunner LLP

(57) ABSTRACT

Digital content encoded in a media file format may be presented by accessing the media file, reading parameters that describe the content, and processing the media file using the encoded parameters to "play" or generate output. Although the media file format may have multiple optional extensions, the media file generally includes one or more frames. Each frame may include a synchronized frame with the synchronized frame having a synchronized header, a video format indicator, an audio format indicator, a width indicator, a height indicator, a frame rate index, and a payload. Although the digital content may include different types and formats, the parameters used in the media file may be used to describe the digital content so that it may be processed independent of the underlying algorithm used. For example, multiple channels of audio signals may be described.

17 Claims, 8 Drawing Sheets

(56) References Cited

U.S. PATENT DOCUMENTS

| | | |
|---|---|---|
| 2003/0236912 A1 | 12/2003 | Klemets et al. |
| 2004/0098633 A1 | 5/2004 | Lienhart et al. |
| 2005/0271269 A1 | 12/2005 | Errico et al. |
| 2006/0140281 A1 | 6/2006 | Nagai et al. |
| 2007/0005795 A1 | 1/2007 | Gonzalez |
| 2010/0265398 A1* | 10/2010 | Johnson ................ H04H 20/30 348/500 |

* cited by examiner

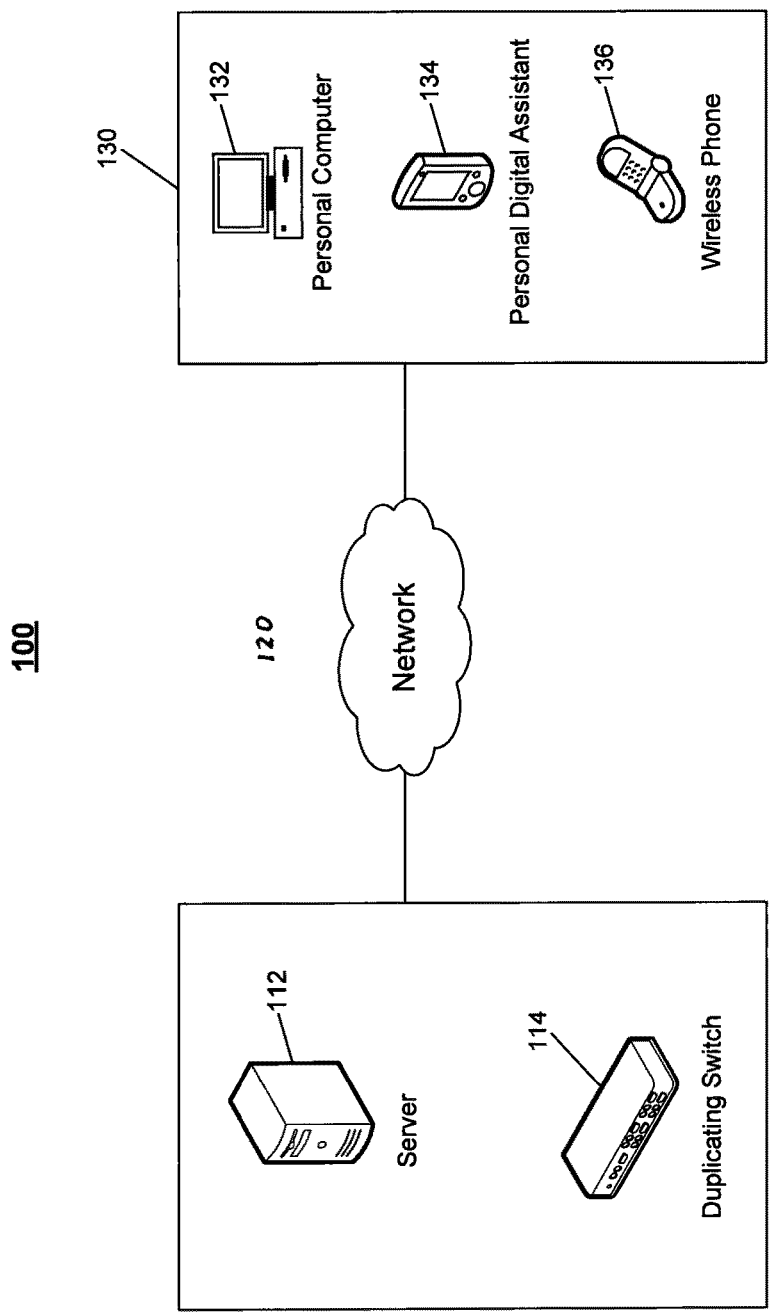

Media File Format

210

| File Header Signature 212 | Header Size 214 | File Size 216 | Bit Stream Length 218 | Metadata Length 220 | Table of Contents Allocated Size 222 | Table of Contents Size 224 | Metadata 226 | Table of Contents 228 |

Fig. 2B
Header
Format

240

| Synchronization Header 242 | Video Format Indicator 244 | Audio Format Indicator 246 | Width Indicator 248 | Height Indicator 250 | Frame Rate Index 252 | Synchronization Offset 254 | Payload 280 |

**Fig. 2C
Synchronization
Frame**

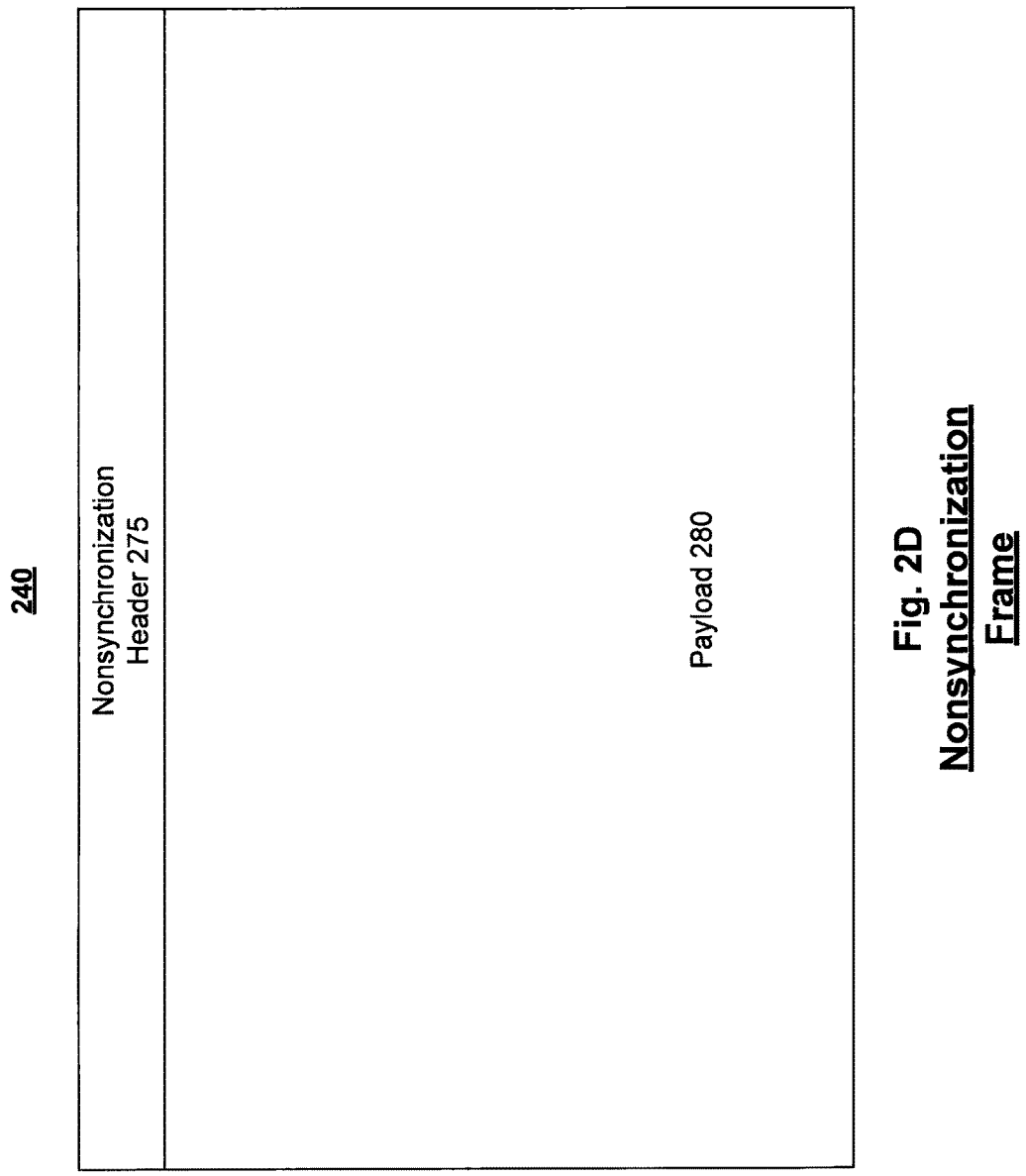

280

| Number of Auxiliary Data Chunks 282 | Combined Audio and Video Data Length 284 | Audio Data Length 286 | Auxiliary Chunk Length 288 | Auxiliary Chunk Type 290 | Auxiliary Chunk Data 292 | Video Data 294 | Audio Data 296 |
|---|---|---|---|---|---|---|---|

Fig. 2E
Payload

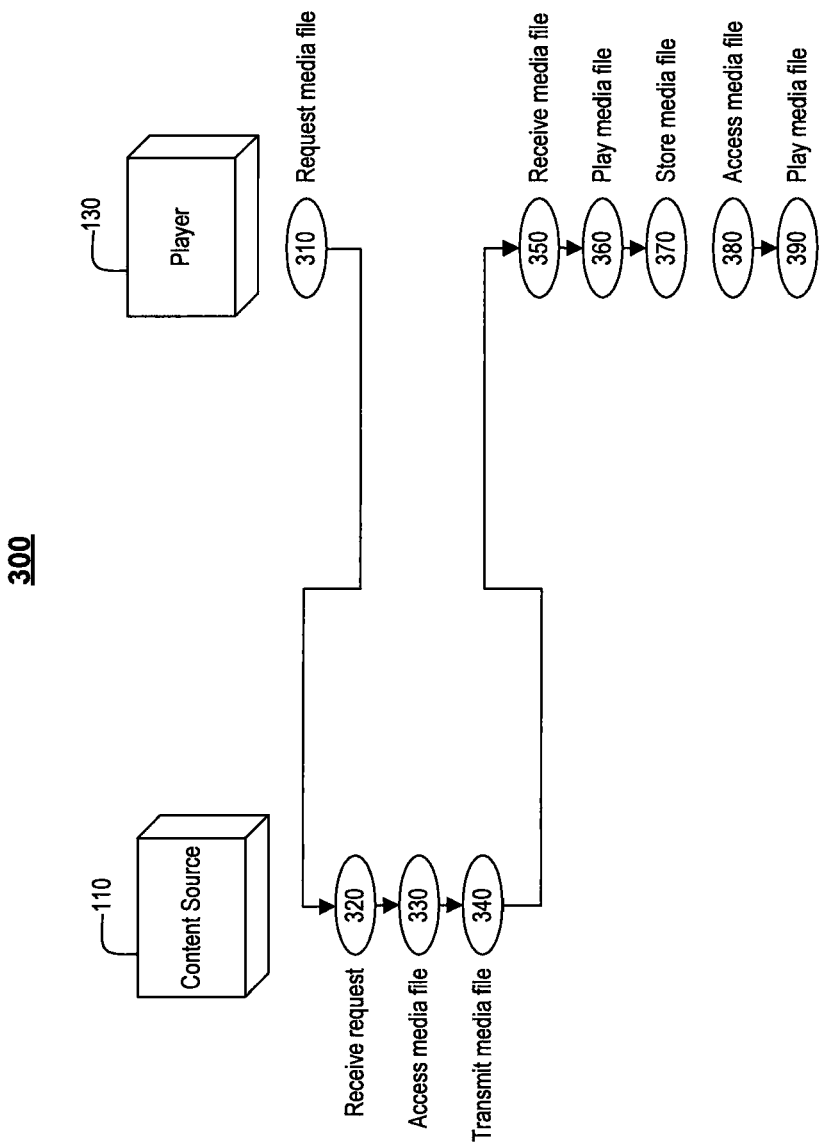

MEDIA FILE FORMAT, SYSTEM, AND METHOD

CROSS-REFERENCE TO RELATED APPLICATIONS

This application is a continuation of U.S. application Ser. No. 10/740,839, filed Dec. 22, 2003 (now allowed), now U.S Pat. No. 8,230,094 which claims priority to U.S. Provisional Application No. 60/466,046, filed Apr. 29, 2003, and titled "A Media File Format, System, and Method." The disclosures of the above applications are expressly incorporated by reference to their entities.

TECHNICAL FIELD

This document relates to file formats.

BACKGROUND

Digital content is being distributed on multiple types of increasingly diverse platforms. The digital content may include movies, music, slides, games and other forms of media. Yet content often is formatted to be compatible with a single one of several diverse devices without regard to other of the devices.

DESCRIPTION OF DRAWINGS

FIG. 1 illustrates a media-based communications system.

FIG. 2B illustrates a header format that may be used in the media file format.

FIG. 2C illustrates a synchronized frame that may be used in the media file format.

FIG. 2D illustrates a nonsynchronized frame that may be used in the media file format.

FIG. 2E illustrates a payload that may be used in the media file format.

FIG. 3 is a flow chart showing how the media file format may be processed.

DETAILED DESCRIPTION

Figure 2A:
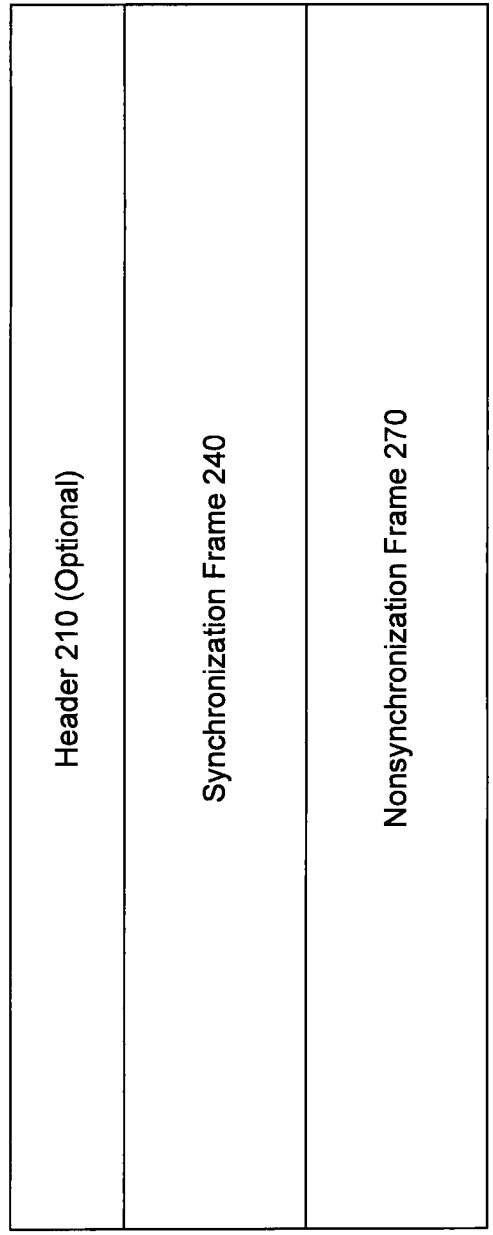
FIG. 2A illustrates a media file format that may be used by the media-based communications system.

In general, a player may access digital content encoded in a media file format. A player may access the media file, read parameters describing the content, and process the media file by using the encoded parameters to "play" or generate output. Although the media file format may have multiple optional extensions, the media file generally includes one or more frames. Each frame may include a synchronized frame with the synchronized frame having a synchronized header, a video format indicator, an audio format indicator, a width indicator, a height indicator, a frame rate index, and a payload. These parameters may be used in generating output for the media file. Optional implementations may include non-synchronized frames and a file header.

Although the digital content may include different types and formats, the parameters used in the media file may be used to describe the digital content so that it may be processed independent of the underlying algorithm used. For example, in the case of a video clip, the parameters may describe the encoding algorithm and frame rate. For an audio signal, multiple channels may be described. Additionally, metadata may be encapsulated in the media file. This metadata may be used to provide titles, track information, as well as links to Internet content to access additional related material.

FIG. 1 illustrates a media-based communications system 100 that may access digital content encoded in media file format. The media-based communications system 100 includes a content source 110, a network 120, and a player 130.

The content source 110 generally includes one or more devices configured to distribute digital content. A content source 110 may be configured to convert a media source (e.g., a video or audio feed) into a first feed of data units for transmission across a network 120. However, in addition or as an alternative, the content source 110 includes a server 112 and a duplicating switch 114. The content source 110 may include a general-purpose computer having a central processor unit (CPU), and memory/storage devices that store data and various programs such as an operating system and one or more application programs. Other examples of a content source 110 include a workstation, a special purpose device or component, a broadcast system, other equipment, or some combination thereof capable of responding to and executing instructions in a defined manner. The content source 110 also may include an input/output (I/O) device (e.g., video and audio input and conversion capability), and peripheral equipment such as a communications card or device (e.g., a modem or a network adapter) for exchanging data with the network 120.

The content source 110 may include playlisting software configured to manage the distribution of content. The playlisting software may organize or enable access to content by a user community. For example, the content source 110 may be operated by an Internet radio station that is supporting a user community by streaming an audio signal. As such, the content source may arrange a sequence of songs for access by the user community.

Where included as illustrated by FIG. 1, the duplicating switch 114 of content source 120 generally includes a device that performs network operations and functions in hardware (e.g., in a chip or part of chip). In some implementations, the duplicating switch 114 may include an ASIC ("Application Specific Integrated Circuit") implementing network operations logic directly on a chip (e.g., logical gates fabricated on a silicon wafer and then manufactured into a chip). For example, an ASIC chip may perform filtering by receiving a packet, examining the IP address of the received packet, and filtering based on the IP address by implementing a logical gate structure in silicon.

Implementations of the duplicating switch 114 may employ a Field Programmable Gate Array (FPGA). A FPGA generally includes a chip or chips fabricated to allow a third party designer to implement a variety of logical designs on the chip. For, example, a third party designer may load a FPGA with a design to replace the received IP addresses with different IP addresses, or may load the FPGA with a design to segment and reassemble IP packets as they are modified while being transmitted through different networks.

Implementations of the duplicating switch 114 also may employ a network processor. A network processor generally includes a chip or chips that allow software to specify which network operations will be performed. A network processor may perform a variety of operations. One example of a network processor may include several interconnected RISC ("Reduced Instruction Set Computer") processors fabricated in a network processor chip. The network processor chip may implement software to change an IP address of an IP packet on some of the RISC processors. Other RISC processors in the network processor may implement software that monitors which terminals are receiving an IP stream.

Although various examples of network operations were defined with respect to the different devices, each of the devices tends to be programmable and capable of performing the operations of the other devices. For example, the FPGA device is described as the device used to replace IP addresses and segment and reassemble packets. However, a network processor and ASIC are generally capable of performing the same operations.

The network 120 may include hardware and/or software capable of enabling direct or indirect communications between the content source 110 and the player 130. As such, the network 120 may include a direct link between the content source and the player, or it may include one or more networks or subnetworks between them (not shown). Each network or subnetwork may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or other delivery mechanism for carrying data.

The player 130 may include one or more devices capable of accessing content on the content source 110. The player 130 may include a controller (not shown) that processes instructions received from or generated by a software application, a program, a piece of code, a device, a computer, a computer system, or a combination thereof, which independently or collectively direct operations of the player 130. The instructions may be embodied permanently or temporarily in any type of machine, component, equipment, storage medium, or propagated signal that is capable of being delivered to the player 130 or that may reside with the controller at player 130. Player 130 may include a general-purpose computer (e.g., a personal computer (PC) 132) capable of responding to and executing instructions in a defined manner, a workstation, a notebook computer, a PDA ("Personal Digital Assistant") 134, a wireless phone 136, a component, other equipment, or some combination of these items that is capable of responding to and executing instructions.

In one implementation, the player 130 includes one or more information retrieval software applications (e.g., a browser, a mail application, an instant messaging client, an Internet service provider client, or an AOL TV or other integrated client) capable of receiving one or more data units. The information retrieval applications may run on a general-purpose operating system and a hardware platform that includes a general-purpose processor and specialized hardware for graphics, communications and/or other capabilities. In another implementation, player 130 may include a wireless telephone running a micro-browser application on a reduced operating system with general purpose and specialized hardware capable of operating in mobile environments.

The player 130 may include one or more media applications. For example, the player 130 may include a software application enabling the player 130 to receive and display an audio or video data stream. The media applications may include controls enabling a user to configure their media environment. For example, if the media application is receiving an Internet radio station, the media application may include controls enabling the user to select an Internet radio station, for example, through the use of "preset" icons indicating the station genre (e.g., country) or a favorite. In another example, the controls may enable the user to rewind or fast forward a media stream they are receiving. For example, if a user does not care for a track on a particular station, the user may interface with a "next track" control that will queue up another song.

Generally, FIGS. 2A-2E illustrate a media file 200 that may be used to encode content. Content encoded to the format shown may be exchanged and played by consumers. Referring to FIG. 2A, the media file 200 may be used by the media-based communications system 100 in exchanging content. For example, an audio file may be formatted according to the format shown and distributed by a content source 110 to player 130. Media file 200 includes an optional header 210, a synchronized frame 240, and an optional nonsynchronized frame 270. More specifically, the media file 200 enables the systems described previously, such as a content source 110 or media player 130, to play digital content residing in and encoded to the parameters in the media file 200.

As shown in FIG. 2B, the optional header 210 may include one or more parameters descriptive of the media file 200. This enables the media file 200 to be incorporated into an intelligent playlist. The optional header 210 includes a file header signature 212, a header size 214, a file size 216, a bit stream length 218, a metadata length 220, a table of contents allocated size 222, table of content size 224, metadata 226, and a table of contents 228.

A sample header format with the lengths, description, and possible values of a file header is shown below:

| Length | Name | Description |
|---|---|---|
| 4 bytes | File Header Signature 212 | This is the file header signature. For example, 'N', 'S', 'V', 'f' (0x4E, 0x53, 0x56, 0x66) may be used. |
| 4 bytes | Header size 214 | This is the length of file header. In one example, 0 or 0xFFFFFFFF may not be used. |
| 4 bytes | File Size 216 | This is the length of file header combined with the length of trailing bit stream data. In one example, it may not be 0, but may be 0xFFFFFFFF, which specified an unknown bit stream length. If this value is less than Header size 214, then the header is not valid. |
| 4 bytes | Bit Stream Length 218 | This is the length of NSV bit stream, in milliseconds. The Bit Stream Length 216 may be any value, with 0xFFFFFFFF signifying unknown total length. |
| 4 bytes | Metadata Length 220 | Length of meta data, in bytes. May be 0 to signify no meta data. |

| Length | Name | Description |
|---|---|---|
| 4 bytes | Table of Contents Allocated Size 222 | This is the allocated size of the Table of Contents, in entries. The allocated size may be 0 to signify that there is no Table of Contents. |
| 4 bytes | Table of Contents Size 224 | This is the size of the Table of Contents that is used, in entries. This value should be less than or equal to Table of Contents Allocated Size 222 |
| Metadata Length 220 bytes | Metadata 226 | Meta data (length specified by Metadata Length 220). |
| Table of Contents Allocated Size 222*4 bytes | Table of Contents 228 | Table of Contents (length specified by Table of Contents Allocated Size 222, multiplied by 4 bytes per entry). |

In one exemplary implementation, the description for the header signature 212, a header size 214, a file size 216, a bit stream length 218, a metadata length 220, a table of contents allocated size 222, and the table of content size 224 have been described in the previous table.

The metadata 226 generally includes information descriptive of the content. The metadata 226 may include additional information about the file, such as title, creator, preferred display aspect ratio, or anything else. This metadata may include any number of name/value pairs. The metadata stored in the file header 210 may be stored as zero or more nonzero bytes. An exemplary file format follows.

The metadata 226 may be formatted as zero or more of the following structures:

[whitespace] NAME=<any nonzero character, C>VALUE<C>[whitespace]

The whitespace in the above format is optional. NAME is any sequence of characters not beginning with whitespace, and not containing an equals sign (=). NAME is followed by an equals sign, and then the next character will be used to delimit VALUE, i.e. it will terminate the value. In this example, NAME is not case sensitive, so 'Title' has the same effect as 'TITLE.' The same NAME can be specified multiple times, but depending on the context in which the value is used, the first instance of NAME may be used.

For example, the following name pairs may be used.

Title='Justin's Crazy Movie'

Aspect=|0.83333333|

Framerate="29.97"

Here is a list of additional metadata items that may be used:

| Name | Description |
|---|---|
| Title | This is the title of file/stream. This may be displayed to the user. |
| URL | This describes a URL of relevant information on the file/stream. Useful for attaching homepage information etc. |
| Creator | This is the encoder of the content. This may be useful for describing the application that encoded the material. |
| Aspect | This is the preferred aspect ratio of the video. This value describes the relative height of the pixels. For example, to display a 720x480 video in 16:9, the aspect ratio would be 720/480/(16/9), or 0.84375. The default for this value is 1.0, for square pixels. |
| Framerate | This is the frame rate of the video. This may be used when the format does not support a frame rate natively. |

The metadata 226 may be set in the format of HTTP header extensions, such as:

x-nsv-title:NewTitle, and x-nsv-aspect:0.83333.

This format may override the 'TITLE' and 'ASPECT' fields in the file header. Alternatively, if no file header was found, these fields may be set.

The table of contents 228 may be used to access different portions of the digital content. The table of contents 228 may include an array of x32-bit unsigned integers. The index of each item in the array reflects the time of that entry. For example, if you have a 60 second file, and the table of content size 224 is 1024 entries, then the 512th entry in table of contents 228 represents the 30 second mark.

The value of each item in the table of contents 228 may represent the offset in the media file bit stream. To continue with the previous example, to seek the 15-second mark in the above example, the 256th entry is read from the table of contents 228, and added to the size of the file header 210. Linear interpolation may be used for seeking to arbitrary times in the file.

If the table of contents allocated size 222 is greater than the table of contents used size 224, then filler entries may be inserted into the table of contents after the portion of table of contents used.

FIG. 2C illustrates a format that may be used in a synchronized frame 240. Generally, the synchronized frame 240 is one of the two frame types that may be used to encapsulate digital content. Generally, a synchronized frame 240 provides a frame signature to signal the start of the synchronized frame and information describing the contents of the video (if the digital content is video). Typically, a content encoder sets a synchronized frames 240 to be on or immediately preceding key frames, that is, frames that indicate segments of contact (e.g., an I frame in MPEG video). Thus, whenever the decoder resynchronizes with a bit stream, the decoder may look for a synchronized frame. The synchronized frame 240 includes a synchronized header 242, a video format indicator 244, an audio format indicator 246, a width indicator 248, a height indicator 250, a frame rate index 252, and a payload 254.

A synchronized frame with descriptions is included in the sample below. Other formats, lengths, and patterns may be used.

| Length | Name | Description |
|---|---|---|
| (Typically, the first 136 bits of synchronized frames do not change from frame to frame): | | |
| 32 bits | synchronized header 242 | This maybe: 'N', 'S', 'V', 's' (0x4E, 0x53, 0x56,0x73) to indicate a NSV file format. |
| 32 bits | video format indicator 244 | This is the video format. |
| 32 bits | audio format indicator 246 | This is the audio format. |
| 16 bits | width indicator 248 | This is the width of video frame (0 = invalid) |
| 16 bits | height indicator 250 | This is the height of video frame (0 = invalid) |
| 8 bits | frame rate index 252 | This is a frame rate index (0 = invalid). |
| (The next 16 bits can change): | | |
| 16 bits | Synchronized offset 254 | This value may be treated as a signed value to describe the a/v synchronized offset, that is, the number of milliseconds ahead of the video the audio is at this frame. |

Another type of frame, the nonsynchronized frame 275, is shown in FIG. 2D. Generally, the synchronized frame 275 may be used to between synchronized frames and includes nonsynchronized header 275 and a payload 280. Typically, the nonsynchronized header is reduced and provides a lower overhead. A sample nonsynchronized header is shown below.

| Length | Name | Description |
|---|---|---|
| 16 bits | Nonsynchronized header 275 | This may be: 0xEF, 0xBE. This may be used to identify the header as a nonsynchronized frame. |
| Variable number of bytes | Payload 280 | Frame payload |

FIG. 2E illustrates a frame payload 280 that may be used in the synchronized frame 240 and the nonsynchronized frame 270 described previously in FIGS. 2C and 2D. The frame payload includes a number of auxiliary data chunks 282, the combined audio and video length 284, the audio data length 286, the auxiliary chunk length 288, the auxiliary chunk type 290, the auxiliary chunk data 292, the video data 294, and the audio data 296. Typically, these portions are used to generate the output that may be displayed or broadcast on the player 130. For example, if the player 130 were a media application on a PC, the frame payload 280 could be used to display a video stream or an Internet radio station. An example payload 280 is shown below.

| Length | Name | Description |
|---|---|---|
| 4 bits | Number of auxiliary data chunks 282 | This describes the number of auxiliary data chunks present |
| 20 bits | Combined Audio and Video Data Length 284 | This describes the combined video and auxiliary data length (if this is greater than 524288 + (Number of auxiliary data chunks 282)*(32768 + 6), the frame is deemed invalid) |
| 16 bits | Audio Data length 286 | This is the audio data length (maximum length: 32768 - if the value is greater than this, the frame is not valid) |
| (Auxiliary data) repeat number of auxiliary data chunks 282 times: | | |
| 16 bits | Auxiliary Chunk Length 288 | This is the length of data for this auxiliary chunk (if this is greater than 32768, the entire frame should be deemed invalid) |
| 32 bits | Auxiliary Chunk Type 290 | This is a 32-bit type of the auxiliary data. |
| Auxiliary Chunk Length 288 | Auxiliary Chunk Data 292 | This is auxiliary chunk data. |
| (end of auxiliary data) end repea | | |
| Variable length number of bytes | Video Data 294 | The length video frame data, length is (Combined Audio and Video Data Length 284)- total auxiliary data chunks |
| (Audio Data length 286) bytes | Audio Data 296 | This portion of the payload includes audio data |

-continued

| Length | Name | Description |
|---|---|---|
| Variable number of bytes | Payload 280 | This is the frame payload |

The term 'chunk' references the content that may be accompany a transmission of audio or video information. Although the term 'chunk' may be used unconventionally, the term indicates that the 'chunk' data is not limited to any particular format, algorithm, protocol, convention, or specification. Thus, in one example, the chunk data may include editorial comments, while another example may use the chunk to store additional audio channels (e.g., for multi-channel audio).

The audio and video data encoded in the frame payload 280 may represent approximately one frame's worth of data. The audio data may be sent ahead of or behind the video, as needed. Auxiliary data chunks can be used to send subtitles, pan information for 16:9 to 4:3 pull down, additional audio tracks, or other information. In the example shown, there can be up to 15 auxiliary data chunks per frame, and each chunk can be anywhere from 0 bytes to 32768 bytes in length. Each chunk may have a 4-byte type.

Referring to FIG. 3, a flow chart 300 illustrates how a content source 110 and a player 130 may exchange a media file. Generally, the content source 110 and player 130 have been described previously in FIG. 1, and the media file that is exchanged has generally been described with respect to FIGS. 2A through 2E.

Initially, the player 130 requests a media file (step 310). The player 130 may explicitly request the media file or the player 130 may implicitly request the media file, through, for example, subscribing to a Internet Radio station feed. The request may include parameters or desired characteristics of the media file. For example, the player 130 may request a particular format, resolution, file size, and/or bit rate.

The content source 110 receives the request (step 320), and accesses the media file (step 330). When the request includes parameters descriptive of the file, the content source 110 may perform some preliminary processing to respond the request. For example, when the request includes a particular format, the content source may reformat the data into the requested format. This may include modifying the frame rate and/or resolution, or decompressing and recompressing the data. The content source then transmits the media file (step 340).

The player 130 receives the media file (step 350), so that the player 130 may then "play" the media file (step 360). This may include generating an audio signal from a set of speakers, or displaying a video signal from a set top box, or on a PC. Depending on the configuration of the media player software on the player 130, the player 130 then may store the media file (step 370).

The player 130 then may subsequently access a stored media file, which may include a media file that has been downloaded to the player 130. Downloading the media file may be done using the network-based exchanged described in steps 310-370, or it may include a consumer inserting a medium (e.g., an optical disk, or flash memory device) with content into a player. In any event, the player 130 may access the media file (step 380) and play the media file. Accessing the media file may include accessing the table of contents and enabling a consumer to select one of several pieces of content.

Figure 4:
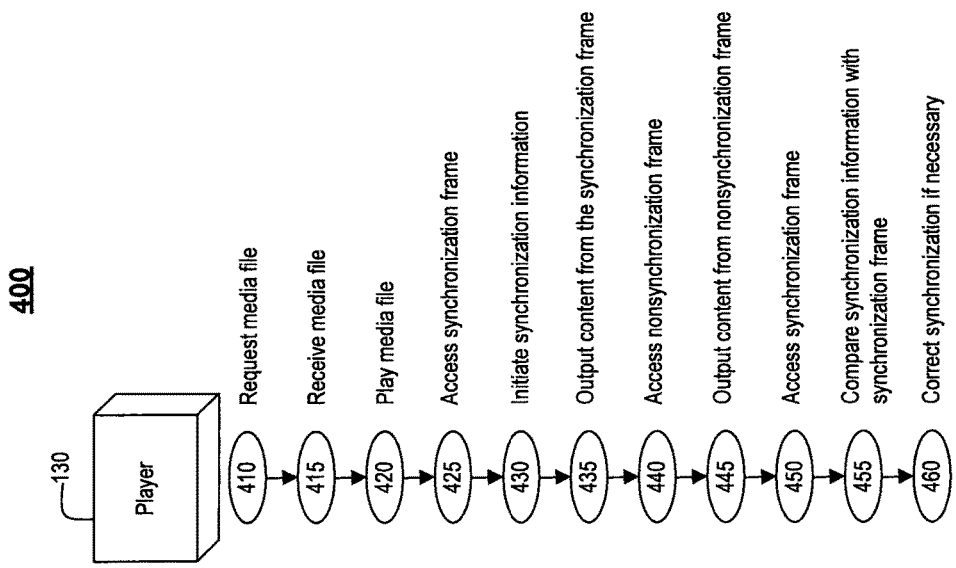
FIG. 4 is a flow chart showing how content in a media file may be synchronized.

Referring to FIG. 4, a flow chart 400 illustrates how a player 130 may process a media file and use the synchronization frame in the media file to synchronize the output of content. Synchronization enables content from multiple sources to be presented in a coordinated manner relative to other content. For example, an actor's voice may be output so that the voice matches the actor's lips as the actor is speaking the words. An example of an unsynchronized presentation would be a movie where the audio signal does not correlate to the displayed images (e.g., the actor does not appear to be speaking the words that are projected, or a timing effect exists between the video and corresponding audio). In one implementation, the systems and operations shown in FIG. 4 relate to the systems and operations shown previously with respect to FIGS. 1-3.

Initially, the player 130 requests a media file (step 410). Requesting the media file may include enabling a portable media player or a set top box to download the media file. The player 130 then receives the media file (step 415). The player 130 plays the media file (step 420) and accesses a synchronization frame (step 425). Typically, accessing a synchronization frame includes reading information that instructs the player 130 to present the content in the synchronization frame simultaneously. For example, a synchronization frame may include an audio signal and a slide show of images. The author may intend that certain slides appear during certain portions of the audio signal. Accessing the synchronization frame instructs the player 130 to coordinate presenting the audio signal in the synchronization frame with the image portion of the synchronization frame.

Accessing the synchronization frame may include initiating synchronization information (step 430). For example, a counter or timer on the player 130 may be used to coordinate the presentation of content. The player 130 may use the synchronization information to regulate the presentation of content that is received in nonsynchronized frames. The synchronization information may be used to ensure that content is presented at a specified frequency.

The content from the synchronization frame is output (step 435). Outputting the content from the synchronization frame may include presenting subtitles in a motion picture. Outputting the content from the synchronization frame also may include performing intermediary processing or filtering before outputting the content. For example, the subtitles in a motion picture may be displayed in response to receiving a user request for subtitles or when the user specifies a language for subtitles and indicates that the subtitles should be used.

The player 130 may optionally access one or more nonsynchronization frames (step 440). Accessing the nonsynchronization frame may include processing the nonsynchronization frames using the synchronization information. For example, information in the nonsynchronization frame may be compared against an expected data rate to determine if the information is arriving at an acceptable rate (not shown). The player 130 may be monitoring for underruns, indicating that the information is arriving at an insufficient rate. The player 130 also may be monitoring for overruns, indicating that the information is arriving at a pace the player 130 is unable to support. The player 130 then outputs the content of the nonsynchronization frame (step 445).

The player 130 accesses a synchronization frame (step 450). Accessing a synchronization frame may be done after one or more nonsynchronization frames are accessed, or accessing a synchronization frame may be done after a prior synchronization frame is accessed. The player 130 may compare the synchronization information with the parameters appearing in the synchronization frame (step 455). The player 130 may determine if the different forms of content are being output at the correct time. The player 130 also may compare the timing information in a synchronization frame with the timing information that is maintained internally on the player 130.

The player 130 may correct the synchronization if a correction is necessary (step 460). For example, the synchronization may be corrected if the synchronization differs by more than 100 milliseconds. Typically, correcting the synchronization includes initiating a corrective action so that future content is synchronized. In one example, initiating the corrective action may include resetting the application so that the most recently received synchronization frame is output. In another example, initiating the corrective action may include making a series of gradual adjustments so that the content is eventually synchronized. Synchronizing the media file is not limited to audio or video content and may include synchronizing different data chunks. The chunks may be synchronized so that the chunks are output in a coordinated manner.

Other implementations are within the scope of the following claims. For example, although the media file format has been described in examples using parameters of a particular length, the length of the parameters may be varied to support the underlying media. Thus, in one example, the length of type parameters is 16 bits long instead of 32 bits long. Other parameters may be included while parameters previously described may not be used. For example, the parameters describing the relative length may be omitted, and instead replaced with signatures used to delineate the payload boundaries.

Although the media-based communications system 100 is shown as a network-based system, one or more of the systems may access media files written in the media file format independently or in a different configuration. For example, a mobile jukebox may play content encoded to the media file format.

The following table features a list of commonly used metadata items:

| Name | Description |
|---|---|
| Title | Title of file/stream. The title may be displayed to the user. |
| URL | URL of relevant information on the file/stream. This may be used to attach homepage information. |
| Creator | Encoder of the content. This may be used to put information regarding which application or author encoded the material. |
| Aspect | Preferred aspect ratio of the video. This value describes the relative height of the pixels. For example, to display a 720x480 video in 16:9, the aspect ratio would be 720/480/(16/9), or 0.84375. The default for this value is 1.0, for square pixels. |

-continued

| Name | Description |
|---|---|
| Frame rate | Frame rate of the video. The metadata frame rate may be used when the media file does not support a frame rate natively. |

The bit stream format can encode to a specific set of frame rates (for frame rates other than these, the file header or the HTTP ("Hyper Text Transfer Protocol") header extensions may be used to transmit the frame rate). Native frame rates may be encoded into a single byte, which is stored inside a synchronization frame. The following operations may be used to translate a byte value to the exact frame rate:

X=byte value
if (X and 0x80 is equal to 0) frame rate=X
otherwise:
T=(X and 0x7f) shifted right two bits
if (T is less than 16) S=1.0 divided by (T plus 1)
otherwise S=T minus 15.
if (X and 1) S=S times 1000 divided by 1001
if ((X and 3) is equal to 3) frame rate=S*24
otherwise if ((X and 3) is equal to 2) frame rate=S*25
otherwise frame rate=S*30

The above format enables an exact representation of all integer frame rates from 1 to 127, as well as many multiples and fractions of the standard NTSC ("National Television Standards Committee") and PAL ("Phase Alternating Line") frame rates (including drop-frame time code). Below is a table of exemplary bytes and frame rates associated therewith:

| | | | | |
|---|---|---|---|---|
| 1 = 1.0000 | 2 = 2.0000 | 3 = 3.0000 | 4 = 4.0000 | 5 = 5.0000 |
| 6 = 6.0000 | 7 = 7.0000 | 8 = 8.0000 | 9 = 9.0000 | 10 = 10.0000 |
| 11 = 11.0000 | 12 = 12.0000 | 13 = 13.0000 | 14 = 14.0000 | 15 = 15.0000 |
| 16 = 16.0000 | 17 = 17.0000 | 18 = 18.0000 | 19 = 19.0000 | 20 = 20.0000 |
| 21 = 21.0000 | 22 = 22.0000 | 23 = 23.0000 | 24 = 24.0000 | 25 = 25.0000 |
| 26 = 26.0000 | 27 = 27.0000 | 28 = 28.0000 | 29 = 29.0000 | 30 = 30.0000 |
| 31 = 31.0000 | 32 = 32.0000 | 33 = 33.0000 | 34 = 34.0000 | 35 = 35.0000 |
| 36 = 36.0000 | 37 = 37.0000 | 38 = 38.0000 | 39 = 39.0000 | 40 = 40.0000 |
| 41 = 41.0000 | 42 = 42.0000 | 43 = 43.0000 | 44 = 44.0000 | 45 = 45.0000 |
| 46 = 46.0000 | 47 = 47.0000 | 48 = 48.0000 | 49 = 49.0000 | 50 = 50.0000 |
| 51 = 51.0000 | 52 = 52.0000 | 53 = 53.0000 | 54 = 54.0000 | 55 = 55.0000 |
| 56 = 56.0000 | 57 = 57.0000 | 58 = 58.0000 | 59 = 59.0000 | 60 = 60.0000 |
| 61 = 61.0000 | 62 = 62.0000 | 63 = 63.0000 | 64 = 64.0000 | 65 = 65.0000 |
| 66 = 66.0000 | 67 = 67.0000 | 68 = 68.0000 | 69 = 69.0000 | 70 = 70.0000 |
| 71 = 71.0000 | 72 = 72.0000 | 73 = 73.0000 | 74 = 74.0000 | 75 = 75.0000 |
| 76 = 76.0000 | 77 = 77.0000 | 78 = 78.0000 | 79 = 79.0000 | 80 = 80.0000 |
| 81 = 81.0000 | 82 = 82.0000 | 83 = 83.0000 | 84 = 84.0000 | 85 = 85.0000 |
| 86 = 86.0000 | 87 = 87.0000 | 88 = 88.0000 | 89 = 89.0000 | 90 = 90.0000 |
| 91 = 91.0000 | 92 = 92.0000 | 93 = 93.0000 | 94 = 94.0000 | 95 = 95.0000 |
| 96 = 96.0000 | 97 = 97.0000 | 98 = 98.0000 | 99 = 99.0000 | 100 = 100.0000 |
| 101 = 101.0000 | 102 = 102.0000 | 103 = 103.0000 | 104 = 104.0000 | 105 = 105.0000 |
| 106 = 106.0000 | 107 = 107.0000 | 108 = 108.0000 | 109 = 109.0000 | 110 = 110.0000 |
| 111 = 111.0000 | 112 = 112.0000 | 113 = 113.0000 | 114 = 114.0000 | 115 = 115.0000 |
| 116 = 116.0000 | 117 = 117.0000 | 118 = 118.0000 | 119 = 119.0000 | 120 = 120.0000 |
| 121 = 121.0000 | 122 = 122.0000 | 123 = 123.0000 | 124 = 124.0000 | 125 = 125.0000 |
| 126 = 126.0000 | 127 = 127.0000 | 128 = 30.0000 | 129 = 29.9700 | 130 = 25.0000 |
| 131 = 23.9760 | 132 = 15.0000 | 133 = 14.9850 | 134 = 12.5000 | 135 = 11.9880 |
| 136 = 10.0000 | 137 = 9.9900 | 138 = 8.3333 | 139 = 7.9920 | 140 = 7.5000 |
| 141 = 7.4925 | 142 = 6.2500 | 143 = 5.9940 | 144 = 6.0000 | 145 = 5.9940 |
| 146 = 5.0000 | 147 = 4.7952 | 148 = 5.0000 | 149 = 4.9950 | 150 = 4.1667 |
| 151 = 3.9960 | 152 = 4.2857 | 153 = 4.2814 | 154 = 3.5714 | 155 = 3.4251 |
| 156 = 3.7500 | 157 = 3.7463 | 158 = 3.1250 | 159 = 2.9970 | 160 = 3.3333 |
| 161 = 3.3300 | 162 = 2.7778 | 163 = 2.6640 | 164 = 3.0000 | 165 = 2.9970 |
| 166 = 2.5000 | 167 = 2.3976 | 168 = 2.7273 | 169 = 2.7245 | 170 = 2.2727 |
| 171 = 2.1796 | 172 = 2.5000 | 173 = 2.4975 | 174 = 2.0833 | 175 = 1.9980 |
| 176 = 2.3077 | 177 = 2.3054 | 178 = 1.9231 | 179 = 1.8443 | 180 = 2.1429 |
| 181 = 2.1407 | 182 = 1.7857 | 183 = 1.7126 | 184 = 2.0000 | 185 = 1.9980 |
| 186 = 1.6667 | 187 = 1.5984 | 188 = 1.8750 | 189 = 1.8731 | 190 = 1.5625 |
| 191 = 1.4985 | 192 = 30.0000 | 193 = 29.9700 | 194 = 25.0000 | 195 = 23.9760 |
| 196 = 60.0000 | 197 = 59.9401 | 198 = 50.0000 | 199 = 47.9520 | 200 = 90.0000 |
| 201 = 89.9101 | 202 = 75.0000 | 203 = 71.9281 | 204 = 120.0000 | 205 = 119.8801 |
| 206 = 100.0000 | 207 = 95.9041 | 208 = 150.0000 | 209 = 149.8501 | 210 = 125.0000 |
| 211 = 119.8801 | 212 = 180.0000 | 213 = 179.8202 | 214 = 150.0000 | 215 = 143.8561 |

| | | | | |
|---|---|---|---|---|
| 216 = 210.0000 | 217 = 209.7902 | 218 = 175.0000 | 219 = 167.8322 | 220 = 240.0000 |
| 221 = 239.7602 | 222 = 200.0000 | 223 = 191.8082 | 224 = 270.0000 | 225 = 269.7303 |
| 226 = 225.0000 | 227 = 215.7842 | 228 = 300.0000 | 229 = 299.7003 | 230 = 250.0000 |
| 231 = 239.7602 | 232 = 330.0000 | 233 = 329.6703 | 234 = 275.0000 | 235 = 263.7363 |
| 236 = 360.0000 | 237 = 359.6404 | 238 = 300.0000 | 239 = 287.7123 | 240 = 390.0000 |
| 241 = 389.6104 | 242 = 325.0000 | 243 = 311.6883 | 244 = 420.0000 | 245 = 419.5804 |
| 246 = 350.0000 | 247 = 335.6643 | 248 = 450.0000 | 249 = 449.5504 | 250 = 375.0000 |
| 251 = 359.6404 | 252 = 480.0000 | 253 = 479.5205 | 254 = 400.0000 | 255 = 383.6164 |

The following section indicates the sample data types that may be used in the media file. The data type is generally a sequence of 4 bytes. These bytes can be 'a'-'z', 'A'-'Z', '0'-'9', '-', '.', '_', or a space (' ' or 0x20). Depending on the implementation, a space (0x20) in the first byte may create difficulties. The challenge may be avoided by using characters other than a space in the first character. For example, "MP3", "DivX", "VP 3", "TEXT", "S.TL" and "PCM" would all be valid types.

| Audio Type | Data description |
|---|---|
| "NONE" | No audio |
| "PCM" | PCM audio data. The first byte in the frame is the bits per sample ("bps", typically 16), the second byte in the frame is the number of channels ("nch", typically 1 or 2), and the third and fourth byte in the frame are the low and high bytes respectively of the sample rate (i.e. 0xAC and 0x44 would be 44100 Hz). The remaining data may include PCM samples, and may align to (nch * bps/8) bytes. |
| "MP3" | MP3 compressed audio data. |
| "OGGv" | OGGvorb is compressed audio data. |
| Video Type | Data description |
| "NONE" | No video |
| "RGB3" | RGB ordered pixel data, 8 bits per pixel packed. |
| "YV12" | YV12 planar YUV data (Average of 12 bits per pixel). |
| "VP31" | On2 VPS compressed video data |
| "VP3" | On2 VPS compressed video data |
| "DivX" | DivX 4 or DivX 5 compressed video data |
| Auxiliary Type | Data description |
| "TIME" | 64 bit little endian timestamp (ms) |
| "FRME" | 64 bit little endian timestamp (frames) |
| "SUBT" | Subtitle. |
| "AUXA" | Auxiliary audio track. 1 byte track identifier, 4-byte format descriptor, 2 bytes of video sync offset, plus audio data. |

What is claimed is:

1. A computer-implemented method for processing a media file, the method comprising:
   accessing, using at least one processor, a first synchronization frame from the media file;
   initiating synchronization information based on the first synchronization frame;
   outputting content from the first synchronization frame, the output content including a first content type and a second content type;
   accessing, using the at least one processor, a second synchronization frame from the media file;
   comparing the synchronization information between the first synchronization frame and the second synchronization frame; and
   adjusting a synchronization between the first content type and the second content type of the output content if a difference between the synchronization information and the second synchronization frame is greater than a predetermined difference threshold,
   wherein the adjusting comprises resetting an application so that the second synchronization frame received is output.

2. The method of claim 1, further comprising:
   accessing at least one nonsynchronization frame from the media file; and
   outputting content from the at least one nonsynchronization frame.

3. The method of claim 2, wherein the at least one nonsynchronization frame is accessed after the first synchronization frame is accessed and before the second synchronization frame is accessed.

4. The method of claim 2, further comprising:
   using the synchronization information to regulate the presentation of content of the at least one nonsynchronization frame.

5. The method of claim 1, wherein the synchronization frames are set on or immediately preceding a key frame or intraframe.

6. The method of claim 1, wherein the synchronization frames each comprise at least one of:
   a header;
   a video format indicator;
   an audio format indicator;
   a width indicator;
   a height indicator;
   a frame rate index;
   a synchronization offset; and
   a payload.

7. The method of claim 1, wherein the at least one nonsynchronization frame comprises:
   a header; and
   a payload.

8. The method of claim 1, further comprising:
   presenting the content of the first synchronization frame simultaneously.

9. A system for processing a media file, the system comprising:
   a storage device that stores a set of instructions; and
   at least one processor that executes the set of instructions, the set of instructions configuring the at least one processor to:
      access a first synchronization frame from the media file;
      initiate synchronization information based on the first synchronization frame;
      output content from the first synchronization frame, the output content including a first content type and a second content type;
      access a second synchronization frame from the media file;
      compare the synchronization information with the second synchronization frame; and
      adjust a synchronization between the first content type and the second content type of the output content if a difference between the synchronization information and the second synchronization information and the second difference threshold, wherein to adjust the synchronization the at least one processor is further configured to reset an application so that the second synchronization frame received is output.

10. The system of claim 9, wherein the at least one processor further executes the set of instructions to:
    access at least one nonsynchronization frame from the media file; and
    output content from the at least one nonsynchronization frame.

11. The system of claim 10, wherein the at least one nonsynchronization frame is accessed after the first synchronization frame is accessed and before the second synchronization frame is accessed.

12. The system of claim 10, wherein the at least one processor further executes the set of instructions to:
    using the synchronization information to regulate the presentation of content of the at least one nonsynchronization frame.

13. The system of claim 9, wherein the synchronization frames are set on or immediately preceding a key frame or intraframe.

14. The system of claim 9, wherein the synchronization frames each comprise at least one of:
    a header;
    a video format indicator;
    an audio format indicator;
    a width indicator;
    a height indicator;
    a frame rate index;
    a synchronization offset; and
    a payload.

15. The system of claim 9, wherein the at least one nonsynchronization frame comprises:
    a header; and
    a payload.

16. The system of claim 9, wherein the at least one processor further executes the set of instructions to:
    presenting the content of the first synchronization frame simultaneously.

17. A tangible, non-transitory computer-readable storage device for processing a media file, the storage device including a set of instructions that, when executed, cause at least one processor to:
    access a first synchronization frame from the media file;
    initiate synchronization information based on the first synchronization frame;
    output content from the first synchronization frame, the output content including a first content type and a second content type;
    access a second synchronization frame from the media file;
    compare the synchronization information with the second synchronization frame; and
    adjust a synchronization between the first content type and the second content type of the output content if a difference between the synchronization information and the second synchronization frame is greater than a predetermined difference threshold,
    wherein to adjust the synchronization the at least one processor is further configured to reset an application so that the second synchronization frame received is output.

* * * * *